United States Patent [19]

Massey

[11] 4,447,843

[45] May 8, 1984

[54] NEGATIVE SEQUENCE NETWORK HAVING A FREQUENCY COMPENSATED FILTER

[75] Inventor: William A. Massey, Mt. Holly, N.J.

[73] Assignee: General Electric Company, King of Prussia, Pa.

[21] Appl. No.: 400,541

[22] Filed: Jul. 21, 1982

[51] Int. Cl.³ .......................... H02H 3/26; H02H 3/34
[52] U.S. Cl. .......................................... 361/76; 361/87; 307/127; 324/86; 324/108
[58] Field of Search ....................... 361/76, 77, 87, 86, 361/78, 79, 85; 324/86, 87, 108; 307/127

[56] References Cited

U.S. PATENT DOCUMENTS

| | | | |
|---|---|---|---|
| 3,947,728 | 3/1976 | Smith | 361/76 |
| 4,067,053 | 1/1978 | Chow | 361/76 |
| 4,156,186 | 5/1979 | Wolfinger | 324/108 |
| 4,333,119 | 6/1982 | Schoenmeyr | 361/76 |
| 4,342,062 | 7/1982 | Hodges | 361/76 |

*Primary Examiner*—Patrick R. Salce
*Attorney, Agent, or Firm*—William Freedman

[57] ABSTRACT

Disclosed is a phase sequence network. The network is compensated for frequency variations in the signal applied to the sequence network so as to develop a desired sequence component output that is accurate over a limited but adequate range of frequencies.

4 Claims, 11 Drawing Figures

NEGATIVE SEQUENCE INPUTS

Fig. 6.(b)

POSITIVE SEQUENCE INPUTS

Fig. 7.

NEGATIVE SEQUENCE NETWORK HAVING A FREQUENCY COMPENSATED FILTER

BACKGROUND

This invention relates to a sequence network or filter used for the protection of an electrical transmission line and generators, and more particularly, to a sequence network having phase shift networks on its input stage which provides compensation for frequency variations of the applied input signal so as to develop a substantially accurate desired sequence component in spite of input frequency variation.

As is known, phase sequence networks are responsive to selected symmetrical components of current in a polyphase alternating current electric power circuit. The theory of symmetrical components is well understood by those skilled in the art of electric power transmission and distribution. In accordance with this theory, the phase currents or voltages in any unbalanced three-phase alternating-current electric circuit can be resolved into three sets of symmetrical, balanced current or voltages vectors known respectively as positive sequence, negative sequence and zero sequence component. The negative and zero sequence components of circuit current and voltage are not present under balanced circuit conditions. A more detailed discussion of the theory of symmetrical components can be found in the textbook, Symmetrical Components, by Wagner and Evans, published by McGraw-Hill in 1933.

It has been known that certain circuits, called sequence networks or filters, can be connected to an electric-power system to provide an output signal that is proportional to the magnitude of the negative sequence components of current. These sequence networks or filters are particularly useful in the protective relaying art as they will sense the presence of negative sequence components of current which flow when the power system becomes unbalanced due to abnormal or fault conditions. It has also been known in the protective relaying art that it is desirable to have a sequence network that senses the positive sequence components of current of the power system. A sequence network commonly utilized in protection of a high voltage transmission line and generators is described in U.S. Pat. No. 4,342,062.

Typically, sequence networks derive their negative or positive sequence components from the voltage or current quantities of a power source having a rated frequency supplying a three phase transmission line. A difficulty with prior sequence networks is that their accuracy may be seriously degraded by changes in the input frequency of the power source. Such frequency changes sometimes occur on electrical power distribution systems where these sequence networks are commonly used. For example, assuming the sequence network desires to sense the negative sequence component related to the three phase transmission line and further assuming only the positive sequence component is applied to the network, for this condition it is desired that no output quantity be developed by the sequence network. However, if the input frequency of the power source changes, an output quantity of the sequence network may occur even though the input signal to the sequence network still contains only a positive sequence component. The output is obviously an error since it indicates a negative sequence component where none exists. This error occurs because the phase and amplitude characteristics of the phase shift networks typically used on one or more phases to obtain phase shifted quantities relative to the other phase or phases vary with deviations from the rated frequency of the power source. Further, this variation may be such that undesired sequence components may no longer be cancelled. It is desired that a sequence network be provided for developing positive or negative components whose performance is substantially constant even though the frequency of the power source supplying the transmission line may be a variable quantity.

One use of a desired sequence network may be in the "art of instrumentation". The term "art of instrumentation" is meant to represent the art of developing in a very accurate manner a function which may be monitored and measured, and which function is an indication of a particular condition of an overall system. For example, in the field of power generation the unbalanced currents, indicative of a power loss quantity, developed within the power generator may be manifested by the presence of negative sequence current. If this negative sequence current is accurately sensed by a sequence network the output of the sequence network may be routed to an external instrumentation circuit, which, in turn may develop an accurate quantity indicative of a primary characteristic, that is the power loss quantity, of the power generator.

Accordingly, one object of the present invention is to provide a sequence network for accurately developing positive or negative sequence components over a limited but adequate range of frequency variations.

It is another object to accurately develop the positive or negative sequence components so that they may be further used for instrumentation purposes.

These and other objects of the present invention will become apparent to those skilled in the art upon consideration of the following description of the invention.

Summary of the Invention

This invention is directed to a sequence network. The sequence network is adapted to be coupled to each phase of a three-phase transmission line by coupling means which develops three signals A, B, and C respectively representative in magnitude and phase of the transmission line currents or of the transmission line voltages. The sequence network is adapted to detect one phase sequence component and reject another phase sequence component of the transmission line currents or voltages. The sequence network has an operative frequency equal to the rated frequency of the transmission line and comprises:

(a) a first phase shift network having applied thereto the signal A and developing a first output signal. The first phase shift network comprises two legs each contributing substantially equal phase shifts but each leg contributing opposite variation in phase shift in response to frequency changes such that the total phase shift of the first phase shift network does not vary substantially in response to frequency changes within a predetermined limited range encompassing the operating frequency;

(b) a second phase shift network having applied thereto said signal B and developing a second output signal. The second phase shift network provides a phase shift opposite to that provided for signal A. The second phase shift network comprises two legs each contributing substantially equal phase shifts but each leg contributing opposite phase shift variations in response to frequency changes such that the total phase shift of the second phase shift network does not vary substantially in response to frequency changes within the predetermined limited range;

(c) first means for summing the first and second output signals so as to obtain a resultant signal that is representative of the vector sum of the first and second output signals;

(d) an additional network with no substantial phase shift properties having applied thereto the signal C for developing a third output signal in phase with signal C and having a magnitude equal to the resultant signal for the particular phase sequence component to be rejected, and;

(e) means for summing the third output signal with the resultant signal and developing a fourth output signal representative of the particular phase sequence component to be detected.

BRIEF DESCRIPTION OF THE DRAWINGS

FIG. 5 shows an equivalent circuit of one of the legs of FIG. 4a.

DETAILED DESCRIPTION OF THE PREFERRED EMBODIMENT

Figure 1:
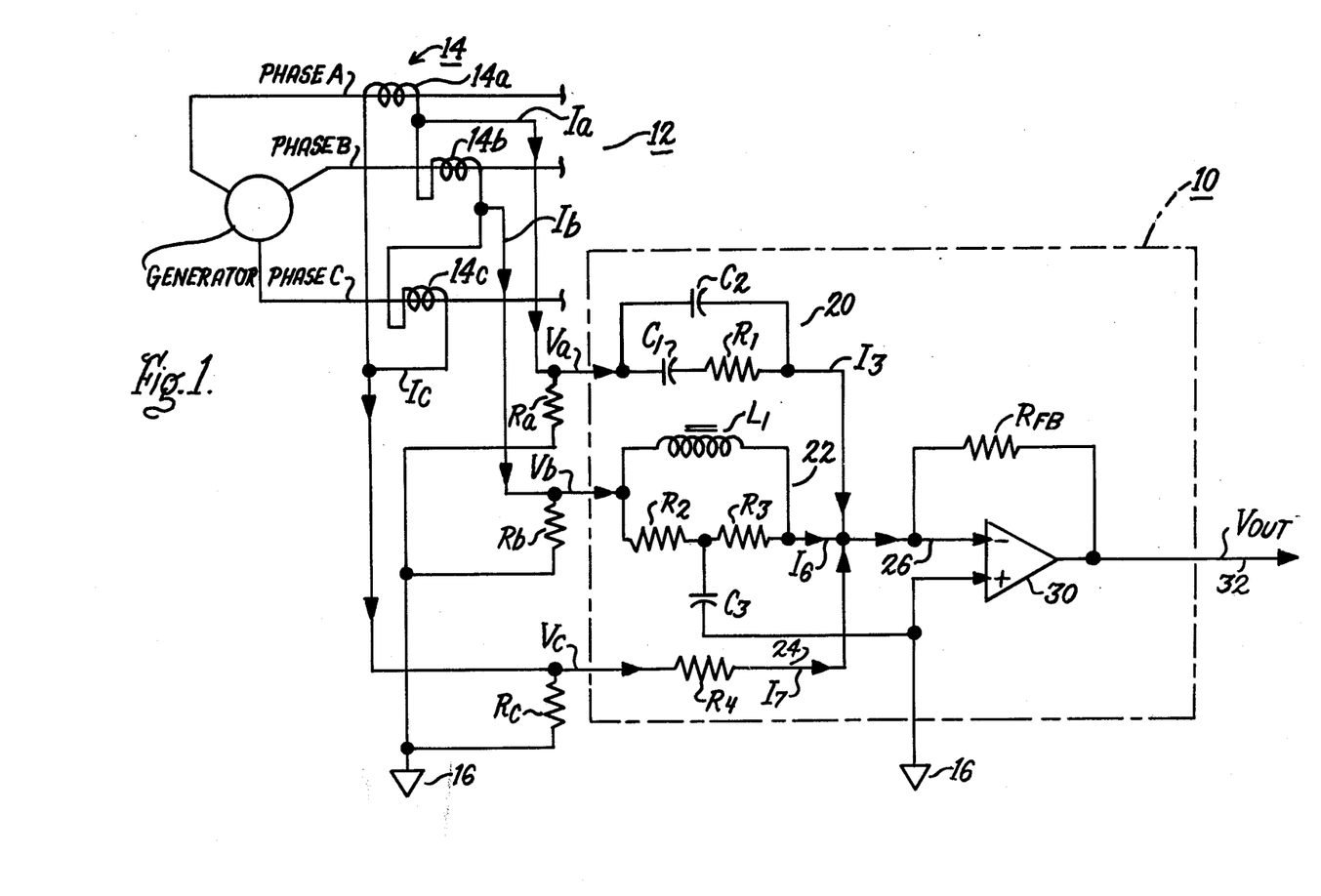
FIG. 1 shows a circuit arrangement of one embodiment of the present invention.

FIG. 1 shows a portion of a three phase transmission line 12 interconnected to a three-phase Generator acting as a power source. FIG. 1 further shows the secondary windings of current transformers $14_a$, $14_b$ and $14_c$ coupled respectively to phases A, B, and C of the transmission line 12. The secondary windings $14_a$, $14_b$ and $14_c$ are arranged in a delta-connected manner. One side of each of the secondary windings $14_a$, $14_b$ and $14_c$ are respectively coupled to wye connected load resistors $R_a$, $R_b$ and $R_c$. The windings $14_a$, $14_b$ and $14_c$ respectively couple the current quantities $I_a$, $I_b$ and $I_c$ to $R_a$, $R_b$ and $R_c$, across which I develops the $V_a$, $V_b$, and $V_c$ voltages applied to a circuit 10 of FIG. 1. For the arrangement shown in FIG. 1, the delta connection of transformers $14_a$, $14_b$ and $14_c$ eliminates the zero-sequence currents that may otherwise flow into the circuit 10 of FIG. 1, and the wye connected load resistors $R_a$, $R_b$ and $R_c$ provide a path for current from the secondary windings $14_a$, $14_b$, and $14_c$ to a neutral 16 of the circuit 10 of FIG. 1.

In general, the circuit 10 of FIG. 1 for one embodiment of the present invention is a sequence network in which the degradation of accuracy, discussed in the Background, created by frequency variations in the power source, such as the generator of FIG. 1, is substantially reduced. This reduction is primarily achieved by the phase shift networks 20 and 22 of the circuit 10. As will be described, the networks 20 and 22 exhibit substantially reduced phase variations typically created by frequency changes. The circuit illustrated in FIG. 1 detects positive sequence components if the normal phase sequence a, b, c is assumed. As will be discussed hereinafter, interchanging the signals to any two inputs results in detection of negative sequence components.

As will be further discussed, the sequence network 10 is adapted to detect one phase sequence component and reject another sequence component of the transmission line currents or voltages. The sequence network 10 has an operating frequency equal to the rated frequency of the transmission line. The first network 20 of the sequence network 10 comprising two legs each contributing substantially equal phase shifts but each leg contributing opposite variation in phase shift in response to frequency changes such that the total phase shift of the first phase shift network does not vary substantially in response to frequency changes within a predetermined limited range encompassing the operating frequency. The second network 22 provides a phase shift opposite to that provided by network 20. The second phase shift network 22 comprises two legs each contributing substantially equal phase shifts but each leg contributing opposite phase shift variations in response to frequency changes such that the total phase shift of the second phase shift network does not vary substantially in response to frequency changes within the predetermined limited range encompassing the operating frequency. The first and second networks 20 and 22 are summed so as to obtain a resultant signal that is representative of the vector sum of the first and second output signals.

An additional network, that is network 24, is provided with no substantial phase shift properties. The network 24 develops a third output signal having a magnitude equal to the resultant signal for the particular phase sequence component to be rejected.

FIG. 1 shows the sequence network circuit 10 having an operational amplifier OP AMP 30. The OP AMP 30 has an inverting and non-inverting input. The OP AMP 30 has an output coupled back to its inverting input by a feedback resistor $R_{FB}$ having a value selected so as to determine the gain of the OP AMP 30. The non-inverting input of OP AMP 30 is coupled to the neutral 16. The inverting input of the OP AMP 30 is coupled to input networks 20, 22, and 24.

The first input network 20 develops a first output signal and is comprised of, a first resistor $R_1$, and a first and second capacitor $C_1$ and $C_2$. The resistor $R_1$ has one of its ends connected to one side of capacitor $C_2$ and also to the inverting input of the OP AMP 30 via a summing junction 26. The other side of resistor $R_1$ is connected to one end of the capacitor $C_1$. The other end of capacitor $C_1$ is connected to the other end of capacitor $C_2$ and is also adapted to receive the quantity $V_a$.

The second input network 22 develops a second output signal and is comprised of, second and third resistors $R_2$ and $R_3$, a third capacitor $C_3$ and a first inductor $L_1$. The resistor $R_2$ has one end connected to one end of inductor $L_1$ and is also adapted to receive the quantity $V_b$. The resistor $R_3$ has one end connected to the other end of resistor $R_2$ and also to one end of capacitor $C_3$. The other end of resistor $R_3$ is connected to the other end of inductor $L_1$ and to the inverting input of the OP AMP 30 via the summing junction 26. The other end of the capacitor $C_3$ is connected to the non-inverting input of the OP AMP 30.

The third input network 24 develops a third output signal and is comprised of a fourth resistor $R_4$ having one of its ends adapted to receive the quantity $V_c$, and its other end connected to the inverting input of the OP AMP 30 via the summing junction 26.

As is to be discussed hereinafter, summing junction 26 provides the means for summing the first and second output signals into a resulting signal. Summing junction 26 further provides the means for summing the resultant signal with the third output signal.

In one embodiment of this invention, the OP AMP 30 in response to the receipt of signals filtered by networks 20, 22 and 24 develops a $V_{OUT}$ signal whose magnitude is proportional to the negative sequence component of the three phase currents $I_a$, $I_b$ and $I_c$. The signal $V_{OUT}$ is accurately developed by the circuit 10 over a limited but adequate range of frequencies. In order that the obtainment of the desired signal $V_{OUT}$ may be more fully described, reference is now made to a detailed description of each of the networks 20, 22, and 24.

Figure 2A:
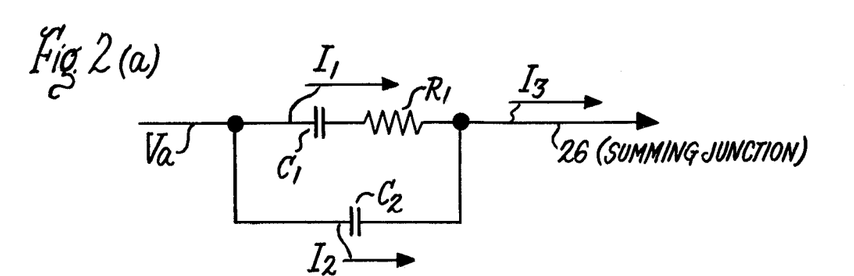
FIGS. 2a, 2b, 3a and 3b show the characteristics of the first network of FIG. 1.
Figure 2B:
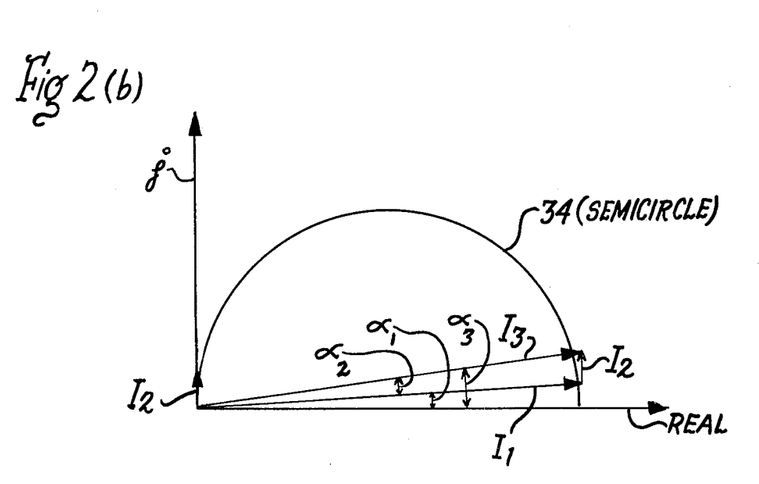

The network 20 is a phase lead type network. Characteristics of network 20 are shown in FIG. 2a and 2b. FIG. 2b shows the real summing junction current component of network 20 along the X axis and the imaginary (j) reactive current component of network 20 along the Y axis. FIG. 2a is a diagram illustrating currents $I_1$, $I_2$ and $I_3$ flowing within the network 20. A vector illustration of the $I_1$, $I_2$ and $I_3$ currents of FIG. 2a is shown in FIG. 2b. FIG. 2b shows angles $\alpha_1$, $\alpha_2$, and $\alpha_3$ respectively associated with quantities $I_1$, $I_2$ and $I_3$. FIG. 2b shows the two current components, $I_1$ and $I_2$ combined to form $I_3$. As is well known, both the amplitude and phase of the quantities $I_1$, $I_2$ and $I_3$ may vary with frequency.

The locus, that is the path of the curve, of $I_1$ of FIG. 2b is shown as the semicircle 34. The vector length of $I_1$ moves clockwise with increasing frequency. The locus of $I_2$ is the vertical axis of FIG. 2b with the vector length of $I_2$ increasing with frequency. The quantities $I_1$ and $I_2$ are shown in FIG. 2b combined to form $I_3$ (refer to the right hand side of FIG. 2b). When the frequency increases, $I_1$ moves clockwise around semicircle 34 decreasing the angle $\alpha_1$ in its movement. During these frequency increases $I_2$ remains vertical and also increases in magnitude with frequency increases so that the angle $\alpha_2$ increases during the decreasing angle $\alpha_1$. The result is that this network's summing current $I_3$ and its angle $\alpha_3$ remain reasonably constant with frequency variations such as those of ±5 percent of the rated frequency.

A desired substantially reduced variation of $I_3$ is obtained when $\alpha_1$ and $\alpha_2$ are selected to approximately equal to each other at the rated frequency of the power source. To select or calculate the component values in my improved network 10, 20 related to $\alpha_1$ and $\alpha_2$ and also the other component of my circuit, it is necessary to assume certain conditions. First assume that a three phase signal having the sequence component desired to be rejected is present at all the three inputs to network 10. Under ideal conditions the voltages at each input are equal in magnitude and separated by angles of 120°. These voltages are shown as $V_a$, $V_b$ and $V_c$ of both FIGS. 6a and 6b to be discussed hereinafter. The currents through $R_a$, $R_b$, and $R_c$ are obtained from the current transformer input currents $I_a$, $I_b$, and $I_c$ respectively, by the previously discussed wye to delta transformations of transformer 14. The component calculations of my circuit 10 may proceed by assuming $|V_{ph}| = |V_a| = |V_b| = |V_c|$. These voltages are phase to neutral voltages and cause the development of equal magnitude currents $I_3$ and $I_6$ at the summing junction 26 in response to $V_a$ and $V_b$ inputs respectively.

Figure 3:
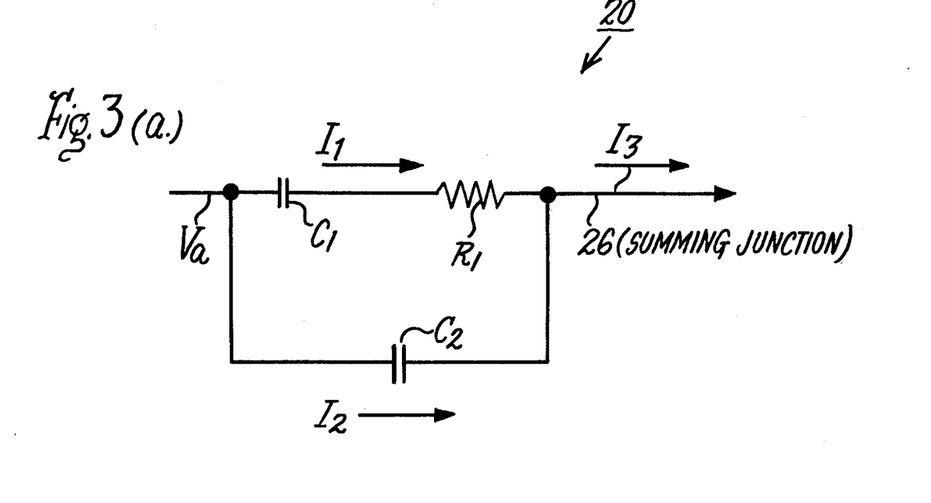

In one embodiment of the present invention, it is desired that the $\alpha_3$ quantity of the $I_3$ current of network 20 be of a value of +15°. Still further for this embodiment it is desired that the $\alpha_1$ and $\alpha_2$ quantities of $I_1$ and $I_3$, respectively, be of a value of +7.5°. Reference is now made to FIG. 3 so as to further describe the desired calculations related to the quantities $\alpha_1$, $\alpha_2$ and $\alpha_3$ all of network 20.

FIG. 3 is a simplified version of FIG. 2. FIG. 3 is composed of FIGS. 3a and 3b. FIG. 3b shows the $I_3$ quantity as having an angle $\alpha_3$ with a typical value of +15°. FIG. 3b further shows $I_3$ as being the vector sum of the quantities $I_1$ and $I_2$. The quantity $I_2$ contributing to the magnitude of $I_3$ is shown by use of a solid line. The reactive component of $I_1$ contributing to the magnitude of $I_3$, which is approximately equal to $I_2$, is shown in phantom.

The quantities $I_2$ and $I_3$ of FIG. 3b and also FIG. 2b may be shown by expressions 1 and 2:

$$2I_2 = I_3 \sin 15° \tag{1}$$

$$I_2 = (I_3/2) \sin 15° \tag{2}$$

The reactance $X_{C2}$ of $C_2$ of network 20 of FIG. 3a may be shown by expression 3:

$$X_{C2} = \frac{V_{ph}}{I_2} = \frac{V_{ph}}{\frac{I_3}{2} \sin 15°} \tag{3}$$

Once $X_{C2}$ is calculated, the value of $C_2$ may be obtained by solving expression 4:

$$X_{C2} = \frac{1}{j\omega C_2} \tag{4}$$

or $$C_2 = \frac{1}{j\omega X_{C2}}$$

where $\omega = 2\pi f$, and f is the operating frequency of the network 20.

The magnitude of $I_1$ of FIG. 3b may be determined by expression 5:

$$I_1 = \frac{I_2}{\sin 7.5°} \tag{5}$$

The impedance $Z_1$ of the path of the current $I_1$ of FIG. 3a may be determined by expression 6:

$$Z_1 = \frac{V_a}{I_1} = \frac{V_a}{\frac{I_2}{\sin 7.50}} = \frac{V_a \sin 7.5°}{\frac{I_3}{2} \sin 15°} \tag{6}$$

The values of $R_1$ and $X_{C1}$ may be trigonometrically expressed in terms of $Z_1$ as $R_1 = Z_1 \cos 7.5°$ and $X_{C1} = Z_1 \sin 7.5°$ respectively. When $X_{C1}$ is determined, the value of $C_1$ may be calculated in a similar manner as $C_3$ of expression (4).

It should now be appreciated that the practice of this invention described for network 20 provides a first and a second leg each contributing an equal phase shift to $I_3$ but having opposite shift changes versus frequency so as to develop an output signal from network 20 that is substantially constant in spite of frequency variations. The first leg of network 20 is comprised of a serially arranged resistor $R_1$ and capacitor $C_1$. The second leg of network 20, which is in parallel with the first leg, is comprised of a capacitor $C_2$. The equal phase angles desired for one embodiment having $\alpha_3 = +15°$, $\alpha_1 = +7.5°$, and $\alpha_2 = +7.5°$, are selectable in accordance with the hereinbefore given description.

Figures 4A, 4B:
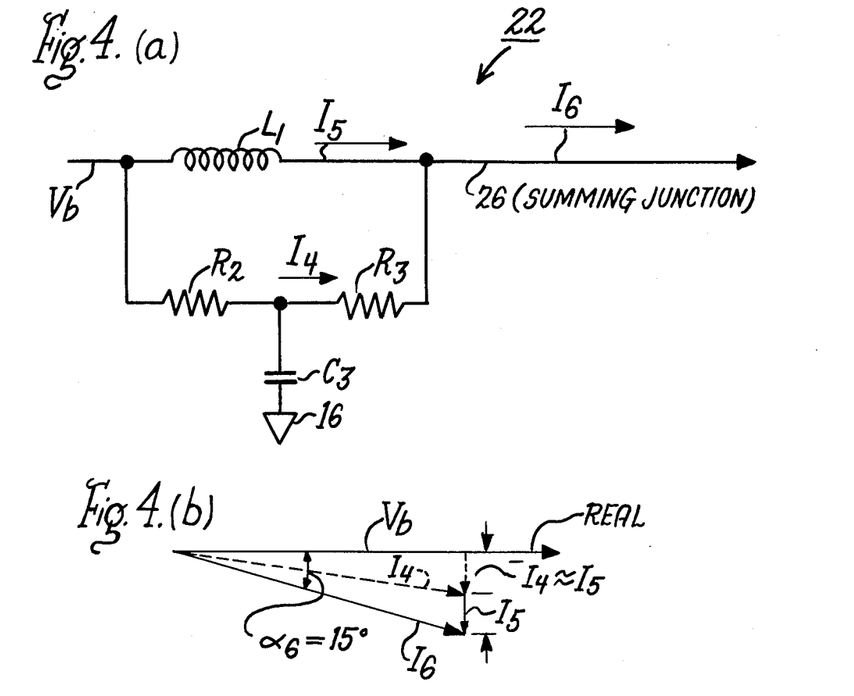
FIGS. 4a, 4b show the characteristics of the second network of FIG. 1.

Reference is now made to FIGS. 4a and 4b so as to describe the desired calculations for the network 22 having a lag-type characteristic. In accordance with the previously mentioned first embodiment of the present invention, it is further desired that the $\alpha_3 = +15°$ desired for network 20 be considered in determining the selection of the desired phase shift of network 22.

FIG. 4a shows the currents $I_4$ and $I_5$ flowing within the legs of network 22 and which combine to form the current $I_6$ at summing junction 26. FIG. 4a further shows the quantity $V_b$ at the input of lag network 22.

FIG. 4b shows the relationship of the currents $I_4$, $I_5$ and $I_6$ of network 22 of FIG. 4a. FIG. 4b further shows the current $I_5$ of FIG. 4d as a reactive negative going vector and the current $I_4$, shown in phantom, as a lagging vector. FIG. 4b further shows a vertical arrow for $I_4$ in phantom for the reactive component of $I_4$. This reactive component of $I_4$ is approximately equal to $I_5$, and contributes to the magnitude of $I_6$. FIG. 4b still further shows the $I_6$ current as having a negative angle $\alpha_6 = 15°$ and being displaced from $V_b$ in a negative direction.

The currents $I_5$ and $I_6$ of FIG. 4b may be expressed by relationships 7 and 8;

$$2I_5 = I_6 \sin 15° \quad (7)$$

$$I_5 = I_6/2 \sin 15° \quad (8)$$

The impedance $X_{L1}$ of the $L_1$ leg, of FIG. 4a, may be described by relationship 9:

$$X_{L1} = \frac{V_b}{I_5} = \frac{V_b}{\frac{I_6}{2}\sin 15°} \quad (9)$$

When $X_{L1}$ is determined, the value of $L_1$ may be obtained from expression 10:

$$X_{L1} = j\omega L_1 \text{ or } L_1 = \frac{X_{L1}}{j\omega} \quad (10)$$

where $\omega = 2\pi f$

For the network 22 of FIG. 4a of the values or $R_2$, $R_3$, and $C_3$ also have to be calculated. For the calculations, to be described, it is assumed that $R_2 = R_3$. In one embodiment of the present invention, it is desired that the voltage across $C_3$ have a desired $-7.5°$ C. phase angle. Further, a certain relationship between $X_{C3}$ and $R_2$ is desired and this relationship may best be described with reference to FIG. 5.

Figure 5:
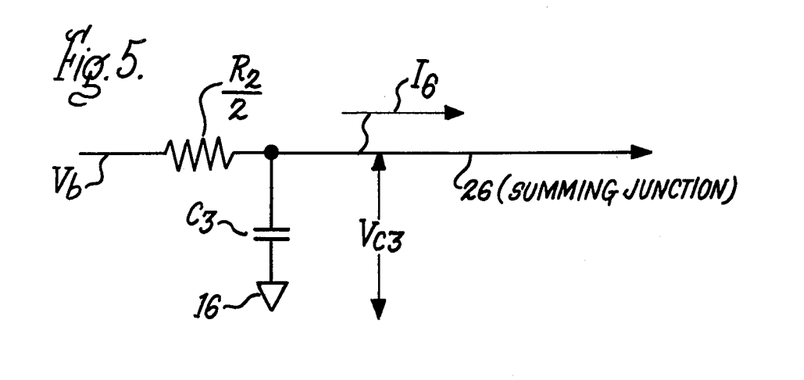

FIG. 5 is an equivalent circuit of one of the legs of network 22 comprised of the resistors $R_2$ and $R_3$, shown in FIG. 5 as $R_2/2$, and the capacitor $C_3$. FIG. 5 shows the voltage of $C_3$ between summing junction 26 and neutral 16 as $V_{C3}$. Still further, the equivalent circuit of FIG. 5 is shown to have applied to it the quantity $V_b$.

The $V_{C3}$ shown in FIG. 5 may be expressed by relationship 12:

$$V_{C3} = \frac{V_b \frac{1}{j\omega C_3}}{2\left(\frac{R_2}{2} + \frac{1}{j\omega C_3}\right)} \quad (12)$$

$$V_{C3} = \frac{V_b}{2\left(\frac{j\omega R_2 C_3}{2} + 1\right)}$$

As mentioned, for one embodiment it is desired that the quantity $V_{C3}$ have a phase angle of $-7.5°$ and as such the denominator of expression (12) may be determined by expression 13:

$$1 + \frac{j\omega R_2 C_3}{2} = 1 + j0.1316 \quad (13)$$

From expression (13) the determination of $C_3$ may be shown by expression 14:

$$\frac{\omega R_2 C_3}{2} = 0.1316 \quad (14)$$

or $$C_3 = \frac{2(0.1316)}{\omega R_2}$$

From the expressions 12 and 14 the $V_{C3}$ may be expressed by relationship 15:

$$V_{C3} = \frac{V_b}{\left(\frac{j\omega R_2(2)(.1316) + 1}{2\omega R_2}\right)^{(2)}} \quad (15)$$

Expression 15 may be simplified by cancelling the $\omega R_2$ terms of its denominator so as to yield expression 16:

$$V_{C3} = \frac{V_b}{\left(\frac{j(2)(.1316)}{2} + 1\right)^{(2)}} \quad (16)$$

Still further, expression 16 may be further simplified and shown as such by expression 17:

$$V_{C3} = \frac{V_b}{2(1 + j(.1316))} \quad (17)$$

$$V_{C3} = .49572 \, V_b$$

In accordance with the one embodiment of this invention, it is desired that the $I_4$ current shown in FIGS. 4a and 4b of network 22 have a value expressed by relationship 18:

$$I_4 = \frac{I_5}{\sin 7.5°} \quad (18)$$

Since the quantity $I_4$ of expression 18 has the relationship $I_4 = (V_{C3}/R_3)$; then the value of $R_3$ may be shown by expression 19:

$$R_3 = \frac{V_{C3}}{I_4} = \frac{V_{C3} \sin 7.5°}{I_5} \quad (19)$$

Similarly, since the quantity of $I_5$ of expression 19 has the relationship $$I_5 = \frac{I_6 \sin 15°}{2},$$

then $R_3$ may be shown by expression 20:

$$R_3 = \frac{2V_{C3} \sin 7.5°}{I_6 \sin 15°} \quad (20)$$

From expression 17 it has been determined that $V_{C3} = 0.49572 \, V_b$ so $R_3$ may be expressed by relationship 21:

$$R_3 = 2(0.49572) \frac{V_b}{I_6} \left( \frac{\sin 7.5°}{\sin 15°} \right) \quad (21)$$

As previously mentioned, $R_2$ and $R_3$ have been assumed to be of an equal value so that $R_2$ may also be determined by that of expression (21).

It should now be appreciated that the practice of this invention provides a network 22 for developing a desired current $I_6$ having a desired lagging phase angle $\alpha_6$ of $-15°$ so as to correspond to the desired network 20 having the desired leading phase angle $\alpha_3 = +15°$.

Figure 6:
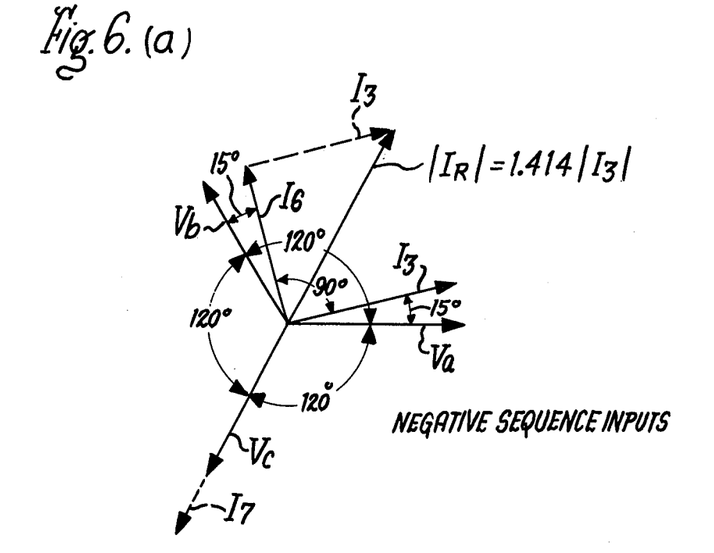
FIGS. 6a and 6b show respectively a vector representation related respectively to positive and negative sequence inputs to the circuit of FIG. 1 or FIG. 7.

For a sequence network like the first embodiment of the present invention which develops a positive sequence component output it is desired that quantities $|I_3|$ and $|I_6|$ be equal, and the phase angle between $I_3$ and $I_6$ be 90° such as shown in FIG. 6a. FIG. 6a still further shows the quantities $V_a$, $V_b$, and $V_c$ having their desired 120° interrelated phase displacements. Further still, FIG. 6a shows the desired orientation of negative sequence type inputs to the circuit 10. Still further, as illustrated in FIG. 6a, to develop the desired positive sequence component of the first embodiment it is desired that the quantities $|I_3|$ and $|I_6|$ be vectorially combined so as to develop a resultant quantity $I_R = 1.414 \, |I_3|$. The resultant quatity $I_R$ may also be selected to be equal to $1.414|I_6|$ (not shown). The $I_R$ quantity has a phase angle of 180° with respect to $I_7$, and $I_7$ is the current from the third input when the input is of a negative sequence type.

The current $I_7$, also shown in FIG. 6a, contributes to the development of resultant quantity $I_R$ in its reaction with the currents $I_3$ and $I_6$ of the first network present at summing junction 26. In order that $I_7$ contribute to the desired resultant quantity $|I_R| = 1.414 \, I_3$, the resistor value of $R_4$ of the third network 24 may be selected in accordance with expression 22;

$$R_4 = \frac{V_c}{1.414 \, I_3} \quad (22)$$

In the operation of the circuit arrangement 10 of FIG. 1 having the applied signals of FIG. 6a, the signal $V_a$ is shifted forward in phase 15° so as to develop $I_3$ of the first network 20 and $V_b$ is shifted back by 15° so as to develop $I_6$ of the second network 22. The angle between $I_3$ and $I_6$ is now 90°. $I_3$ and $I_6$ are summed so that resultant $I_R$ is out of phase with $V_b$ and has an amplitude 1.414 times that of $I_3$ or $I_6$. The current $I_7$ has no substantial phase shift with respect to $V_c$. The magnitude of $I_7$ is adjusted by the selection of $R_4$ so as to match or equal that of $I_R$. The summing of $I_R$ and $I_7$ gives a zero output signal in response to the negative sequence type signals $V_a$, $V_b$ and $V_c$ shown in FIG. 6a. More particularly for one embodiment of the present invention, if the signals $V_a$, $V_b$, and $V_c$, representative of negative sequence type signals to be rejected by the circuit 10, are applied to circuit 10 then the output $V_{OUT}$ is substantially zero.

Typically, the input signals $V_a$, $V_b$, and $V_c$ contain both positive and negative sequence components. Input signals $V_a$ $V_b$, and $V_c$ of a positive sequence type are shown in FIG. 6b. The positive sequence type signals of $V_a$, $V_b$ and $V_c$ develop currents $I_3$ shifted forward by 15° from $V_a$, $I_6$ shifted back by 15° from $V_b$, and $I_7$ with no substantial phase shift with respect to $V_c$. The currents $I_3$, $I_6$ and $I_7$ at summing junction 26 do not cancel. In response to the positive sequence type signals the sequence network 10 of FIG. 1, develops an output signal $V_{OUT}$ representative of the combined vector type currents $I_3$, $I_6$ and $I_7$ of FIG. 6b. The magnitude of $V_{OUT}$ being representative of the positive sequence component of the currents $I_a$, $I_b$, and $I_c$ flowing in the transmission line 12 and also representative of the applied voltages $V_a$, $V_b$, and $V_c$.

It should now be appreciated that the circuit 10 of FIG. 1 selects a positive sequence component with an accuracy that is substantially constant in spite of frequency variations in its applied signals $V_a$, $V_b$, and $V_c$. The accurate and constant output signal $V_{OUT}$ of FIG. 1 is developed by my networks 20, 22 and 24 in accordance with the practice of my invention.

Still further, although the circuit 10 of FIG. 1 has been described with regard to obtaining the positive sequence component of transmission line 12, the negative sequence quantity may be easily obtained by the practice of this invention by rearranging the inputs to circuit 10 so as to simply switch any two of the three inputs. For example, if the input $V_b$ and $V_c$ shown as applied to FIG. 1 are switched then the signals $V_a$, $V_c$, and $V_b$ have relative phase position representation of a negative sequence orientation and the circuit 10 of FIG. 1, in turn, develops an output signal $V_{OUT}$ representative of the negative sequence component of the current $I_a$, $I_b$ and $I_c$ flowing in transmission line 12.

The hereinbefore given description is related to circuit 10 of FIG. 1. In practice, the calculation of component values of circuit 10 and the arrangement of electronic components may be improved so as to permit a trimming or tuning of the desired values by the circuit 40 of FIG. 7.

Figure 7:
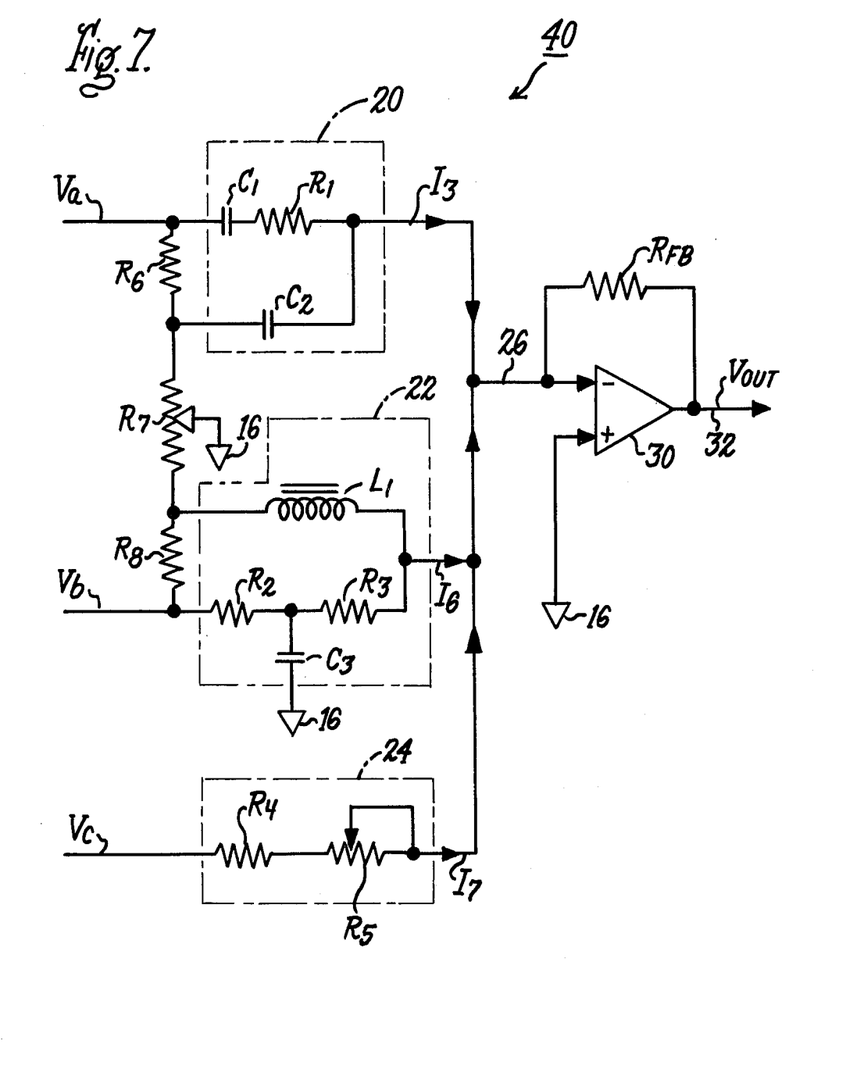
FIG. 7 shows a circuit arrangement of another embodiment of the present invention.

FIG. 7 shows the circuit 40 as having the previously described networks 20, 22, and 24, the OP AM 30, and $R_{FB}$ all of FIG. 1. The description of the circuit components of FIG. 1, shown in FIG. 7, is also applicable to circuit 40 of FIG. 7 Although the front end coupling of circuit 10 to transmission line 12, via current transformers 14a, 14b and 14c and resistors $R_a$, $R_b$ and $R_c$ is not shown in FIG. 7, it is applicable to the second embodiment of the present invention circuit 40 of FIG. 7.

FIG. 7 shows a serial arrangement (not shown in FIG. 1) between $V_a$ and $V_b$ voltages applied to circuit 40, comprised of resistor $R_6$, potentiometer $R_7$ having one end of its adjustable arm coupled to neutral 16, and a resistor $R_8$. FIG. 7 further shows a potentiometer $R_5$ (not shown in FIG. 1) serially arranged with resistor $R_4$. The resistors $R_4$ and $R_5$ comprise network 24.

FIG. 7 has two adjustment potentiometers $R_5$ and $R_7$ that permit the circuit 40 to be adjusted to compensate for component inaccuracies. In practice, these potentiometers $R_5$ and $R_7$ are adjusted by applying pure negative sequence signals for $I_A$, $I_B$, and $I_C$ represented by the signals $V_a$, $V_b$, $V_c$, $I_3$, $I_6$ and $I_7$ of FIG. 6a and nulling the output $V_{OUT}$ using potentiometers $R_5$ and $R_7$.

The circuit 40 of FIG. 7 and the circuit 10 which detect the positive sequence component may also operate to detect the other sequence component by simply reversing any two input signals in a manner as described for circuit 10 of FIG. 1. For example, if it is desired that a signal $V_{OUT}$ be representative of the negative sequence component of the currents $I_a$, $I_b$, and $I_c$ flowing in transmission line 12, then currents $I_a$ and $I_b$ routed to circuit 40 via signal $V_a$ and $V_b$ are simply interchanged.

The circuit 40 of FIG. 7 and also the circuit 10 of FIG. 1 each operate in a desired manner so as to provide typical results shown in Table 1.

TABLE 1

| Frequency (in Hz) | Error Value (in percent) |
|---|---|
| 57 | 0.38 |
| 58 | 0.25 |
| 59 | 0.14 |
| 60 | 0.11 |
| 61 | 0.19 |
| 62 | 0.29 |
| 63 | 0.39 |

Table 1 shows two columns: (1) the frequency variations related to the quantities $I_a$, $I_b$ and $I_c$ and $V_a$, $V_b$, and $V_c$ applied to the circuits 40 and 10 of the present invention, and (2) the typical error values given in percentages. The error values are applicable to the development of an output signal $V_{OUT}$ for both positive and negative sequence components. For example, a percentage error of 0.11 for 60 Hz application may be developed for the negative sequence component in response to quantities $I_a$, $I_b$ and $I_c$ which do not have any negative sequence components.

The resistive, capacitive, and inductive components of circuit arrangement 10 for a 60 Hz application may have typical values as given in Table 2.

TABLE 2

| Components | Typical Value |
|---|---|
| $R_1$ | 9914 ohms |
| $R_2$ | 5088 ohms |
| $R_3$ | 5088 ohms |
| $R_4$ | 7070 ohms |
| $C_1$ | 1.979 m farads |
| $C_2$ | 0.03445 m farads |
| $C_3$ | 0.1372 m farads |
| $L_1$ | 204 henry |

It should now be appreciated that the present invention provides a sequence network for accurately developing positive or negative sequence components over a limited but adequate range of frequency variations.

While I have shown and described particular embodiments of my invention, it will be obvious to those skilled in the art that various changes and modifications may be made without departing from my invention in its broader aspects; and I, therefore, intend herein to cover all such changes and modifications as fall within the true spirit and scope of my invention.

What I claim is:

1. A sequence network adapted to be coupled to each phase of a three phase transmission line by coupling means which develops three signals A, B, and C respectively representative in magnitude and phase of the transmission line currents or of the transmission line voltages, said sequence network being adapted to detect one phase sequence component and reject another phase sequence component of the transmission line currents or voltages, said sequence network having an operating frequency equal to the rated frequency of the transmission line and comprising:
   (a) a first phase shift network having applied thereto said signal A and developing a first output signal, said first phase shift network comprising two legs each contributing substantially equal phase shifts but each leg contributing opposite variation in phase shift in response to frequency changes such that the total phase shift of the first phase shift network does not vary substantially in response to frequency changes within a predetermined limited range encompassing said operating frequency,
   (b) a second phase shift network having applied thereto said signal B and developing a second output signal, said second phase shift network providing a phase shift opposite to that provided for signal A, said second phase shift network comprising two legs each contributing substantially equal phase shifts but each leg contributing opposite phase shift variations in response to frequency changes such that the total phase shift of the second phase shift network does not vary substantially in response to frequency changes within said predetermined limited range,
   (c) first means for summing said first and second output signals so as to obtain a resultant signal that is representative of the vector sum of said first and second output signals,
   (d) an additional network with no substantial phase shift properties having applied thereto said signal C for developing a third output signal in phase with signal C and having a magnitude equal to said resultant signal for the particular phase sequence component to be rejected, and
   (e) means for summing said third output signal with said resultant signal and developing a fourth output signal representative of the particular phase sequence component to be detected.

2. The sequence network according to claim 1, wherein said sequence network comprises:
   (a) an operational amplifier having an output, a non-inverting input coupled to a neutral associated with signals A, B, and C and an inverting input coupled to the output of the operational amplifier by a resistor $R_{FB}$;
   (b) said first network for developing the first output signal and comprising a first resistor $R_1$, and a first and second capacitor $C_1$ and $C_2$, said resistor $R_1$ has one of its ends connected to one side of capacitor $C_2$ and to said inverting input, the other side of resistor $R_1$ is connected to one end of the capacitor $C_1$ the other end of capacitor $C_1$ being connected to the other end of capacitor $C_2$ and is adapted to receive the signal A, said resistor $R_1$ and capacitor $C_1$ forming a first leg of the first network and the capacitor $C_2$ forming a second leg of the first network;

(c) said second network for developing the second output signal and comprising second and third resistors $R_2$ and $R_3$, a third capacitor $C_3$ and a first inductor $L_1$, said resistor $R_2$ has one end connected to one end of inductor $L_1$ and is adapted to receive the signal B, said resistor $R_3$ has one end connected to the other end of resistor $R_2$ and one end of capacitor $C_3$, the other end of resistor $R_3$ is connected to the other end of inductor $L_1$ and to the inverting input, said inductor $L_1$ forms a first leg of the second network, said resistors $R_2$ and $R_3$, and the capacitor $C_3$ forming a second leg of the second network, the other end of the capacitor $C_3$ being connected to the non-inverting input which is also coupled to the neutral related to the input quantities; said inverting input of said operational amplifier providing a junction for summing the first and second output signal so as to develop the resultant signal;

(d) said additional network developing the third output signal and comprised of a fourth resistor $R_4$ having one of its ends adapted to receive the signal C and its other end connected to the inverting input, wherein;

the component values of said first network being selected so as to provide said desired phase shifts thereof;

the component values of said second network being selected so as to provide said desired phase shifts thereof; and the value of $R_4$ being selected so as to provide said third output signal.

3. The sequence network according to claim 1, wherein said negative sequence network comprises:

(a) an operational amplifier having an output, a non-inverting input coupled to a neutral associated with signals A, B, and C and an inverting input coupled to the output of the operational amplifier by the resistor $R_{FB}$;

(b) said first network for developing the first output signal and comprising a first resistor $R_1$, a sixth resistor $R_6$, a first variable portion of a seventh variable resistor $R_7$ and a first and second capacitors $C_1$ and $C_2$, said resistor $R_7$ having two ends and a variable arm having one of its ends coupled to said neutral, said first variable portion of resistor $R_7$ being coupled to one end of said resistor $R_6$, said resistor $R_1$ has one of its ends connected to one side of capacitor $C_2$ and to said inverting input, the other side of resistor $R_1$ is connected to one end of the capacitor $C_1$, the other end of capacitor $C_1$ being connected to the other end of capacitor $C_2$ by said sixth resistor, and said other end of said resistor $R_6$ being adapted to receive said signal A, said resistor $R_1$ and capacitor $C_1$ forming a first leg of the first network and the capacitor $C_2$ forming a second leg of the first network;

(c) a second input network comprising a second and third resistors $R_2$ and $R_3$, a second variable portion of said seventh variable resistor $R_7$, an eighth resistor $R_8$, a third capacitor $C_3$, and a first inductor $L_1$, said second variable portion of resistor $R_7$ being coupled to one end of resistor $R_8$; said resistor $R_2$ having one end connected to one end of inductor $L_1$ by said resistor $R_8$ and said other end of said resistor $R_8$ being adapted to receive said signal B, said resistor $R_3$ has one end connected to the other end of resistor $R_2$ and one end of capacitor $C_3$, the other end of resistor $R_3$ being connected to the other end of inductor $L_1$ and to the inverting input, said inductor $L_1$ forming the first leg of the second network, said resistors $R_2$ and $R_3$, and the capacitor $C_3$ forming the second leg of the second network, the other end of the capacitor $C_3$ being connected to the non-inverting input, (d) a third input network for developing said third output signal and comprised of a fourth resistor $R_4$ and a variable resistor $R_5$, said fourth resistor $R_4$ having one of its ends adapted to receive said signal C and its other end connected to the inverting input by said fifth variable resistor, wherein;

the component values of said first network being selected so as to provide said desired phase shifts thereof;

the component values of said second network being selected so as to provide said desired phase shifts thereof;

the component values of said third network being selected so as to provide said third output signal; and said variable resistors $R_5$ and $R_7$ being adjusted so as to develop a zero voltage output for the fourth output signal in response to phase sequence components of the signal A, B and C selected to be rejected.

4. The sequence network according to either claim 1, claim 2 or claim 3, wherein said component values of said first network is selected so as to provide (1) the total shift value of a positive fifteen (15) degrees comprised of a positive seven and one-half (7.5) degrees phase shift contributed by each of said first and second legs of the first network, and component values of said second network is selected so as to provide (2) a total phase shift of value of a negative fifteen (15) degrees comprised of a negative seven and one-half (7.5) contribution by each of said first and second legs of said second network, said component values being selected in accordance with said operating frequency of said sequence network.

* * * * *